(12) United States Patent
Baker et al.

(10) Patent No.: US 7,779,465 B2
(45) Date of Patent: Aug. 17, 2010

(54) DISTRIBUTED PEER ATTACK ALERTING

(75) Inventors: Arthur H. Baker, Redmond, WA (US); Gregory D. Hartrell, Redmond, WA (US); Carl Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/441,508

(22) Filed: May 26, 2006

(65) Prior Publication Data

US 2007/0277242 A1    Nov. 29, 2007

(51) Int. Cl.
*G06F 11/07* (2006.01)

(52) U.S. Cl. .......................... 726/22; 726/23

(58) Field of Classification Search .............. 726/22–25
See application file for complete search history.

(56) References Cited

U.S. PATENT DOCUMENTS

| | | | |
|---|---|---|---|
| 6,308,272 B1 | 10/2001 | Pearce | |
| 6,654,882 B1 | 11/2003 | Froutan et al. | |
| 6,684,329 B1 | 1/2004 | Epstein et al. | |
| 6,785,821 B1 | 8/2004 | Teal | |
| 7,007,302 B1 | 2/2006 | Jagger et al. | |
| 2003/0200464 A1 | 10/2003 | Kidron | |
| 2004/0049693 A1 | 3/2004 | Douglas | |
| 2004/0255163 A1 | 12/2004 | Swimmer et al. | |
| 2005/0027854 A1 | 2/2005 | Boulanger et al. | |
| 2005/0132230 A1 | 6/2005 | Miclea et al. | |
| 2006/0056391 A1 | 3/2006 | Rana et al. | |
| 2007/0101423 A1* | 5/2007 | Oliver et al. .................. 726/22 | |

OTHER PUBLICATIONS

Shankar, Mallikarjun, et al. "Fusing Intrusion Data for Detection and Containment", http://www.ioc.ornl.gov/projects/documents/zero1.pdf, 2003.
Kannan, Jayanthkumar, et al. "Cooperative Containment of Fast Scanning Worms", http://www.eecs.berkeley.edu/Pubs/TechRpts/2004/CSD-04-1359.pdf, 2004.
Gorton, Dan, "Extending Intrusion Detection with Alert Correlation and Intrusion Tolerance", http://unbolted.Ilarian.net/ids-docs/extending-ids-with-alert-correlation-and-intrusion-tolerance.pdf, 2003.

* cited by examiner

*Primary Examiner*—Kimyen Vu
*Assistant Examiner*—Edward Zee
(74) *Attorney, Agent, or Firm*—Capitol City TechLaw; Richard C. Irving

(57) ABSTRACT

A system and method for distributed peer attack alerting is disclosed. The method includes accessing a peer community wherein the peer community comprises a plurality of nodes comprising a network and wherein at least one of the plurality of nodes comprises an attack identifier. The method further includes identifying an attack at one of the plurality of nodes. In addition, the method includes transmitting an alert to the plurality of nodes, the alert comprising information associated with the attack and automatically configuring at least one attack identifier associated with one of the plurality of nodes in response to the alert.

20 Claims, 5 Drawing Sheets

400

```
┌─────────────────────────────────────────────┐
│ Accessing a peer community, the peer community │
│ comprising a plurality of nodes communicatively │
│ coupled to a network wherein each of the plurality │
│ of nodes comprises an attack identifier. │
│ 402 │
└─────────────────────────────────────────────┘
                      ↓
┌─────────────────────────────────────────────┐
│ Identifying an attack at one of the plurality of nodes. │
│ 404 │
└─────────────────────────────────────────────┘
                      ↓
┌─────────────────────────────────────────────┐
│ Broadcasting an alert to the plurality of nodes, the alert │
│ comprising information associated with the attack. │
│ 406 │
└─────────────────────────────────────────────┘
                      ↓
┌─────────────────────────────────────────────┐
│ Automatically configuring at least one attack identifier │
│ associated with one of the plurality of nodes in │
│ response to the broadcast alert. │
│ 408 │
└─────────────────────────────────────────────┘
```

```
Identifying an attack at one of the plurality of nodes.
502
```
↓
```
Generating an alert petition associated with the attack, the
alert comprising information associated with the attack.
504
```
↓
```
Automatically configuring at least one attack detection
system associated with one of the plurality of nodes in
response to the alert petition.
506
```

FIG. 5

DISTRIBUTED PEER ATTACK ALERTING

BACKGROUND

In order to respond effectively to a self-propagating malicious code outbreak (e.g. a computer worm), system administrators need to detect and contain the problem quickly before it becomes widespread. Failure to do so can result in untold damage, including system instability, downtime and data loss.

Conventional security event and alerting systems typically receive their data through centralized sources where analysis and response can occur manually or automatically. This centralized model creates a long round trip for an event to be alerted (based on one or many events). More time is then required for the alert to be translated into a reaction to prevent the attack detected (either manually by an operator, or automatically based on defined criteria on how to react to a type of attack).

Furthermore, other existing security event and alerting systems (such as intrusion prevention systems) monitor for security events or alerts only at network gateway egress and ingress points. This presents the problem of missing highly localized network attacks, such as those that happen within a subnet, never traversing the points in which security events are monitored.

Therefore, what is needed is an improved security event and alerting system that shortens the conventional long round trip for an event to go to alert and is able to more easily identify localized attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one embodiment, a method for distributed peer attack alerting is disclosed. The method includes accessing a peer community wherein the peer community comprises a plurality of nodes comprising a network and wherein at least one of the plurality of nodes acts as an attack identifier. The method further includes identifying an attack at one of the plurality of nodes. In addition, the method includes transmitting an alert to the plurality of nodes, the alert comprising information associated with the attack and automatically configuring at least one attack identifier associated with one of the plurality of nodes in response to the alert.

DESCRIPTION OF THE DRAWINGS

The accompanying drawings, which are incorporated in and form a part of this specification, illustrate embodiments of the technology for distributed peer attack alerting, together with the description, serve to explain principles discussed below:

FIG. 4 is a data flow diagram of an exemplary computer implemented method in accordance with embodiments of the present technology for distributed peer attack alerting.

FIG. 5 is a data flow diagram of an exemplary computer implemented method including forming of a peer community in accordance with embodiments of the present technology for distributed peer attack alerting.

The drawings referred to in this description should be understood as not being drawn to scale except if specifically noted.

DETAILED DESCRIPTION

Reference will now be made in detail to embodiments of the present technology for distributed peer attack alerting, examples of which are illustrated in the accompanying drawings. While the technology for distributed peer attack alerting will be described in conjunction with various embodiments, it will be understood that they are not intended to limit the present technology for distributed peer attack alerting to these embodiments. On the contrary, the presented technology for distributed peer attack alerting is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for distributed peer attack alerting. However, the present technology for distributed peer attack alerting may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "accessing", "transmitting", "forming", "identifying", "voting", "testing", "comparing", "classifying", "reporting", "configuring", "determining", "providing", and "incrementing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for distributed peer attack alerting is also well suited to the use of other computer systems such as, for example, optical and mechanical computers. Additionally, it should be understood that in embodiments of the present technology for distributed peer attack alerting, one or more of the steps can be performed manually.

Example Computer System Environment

Figure 1:
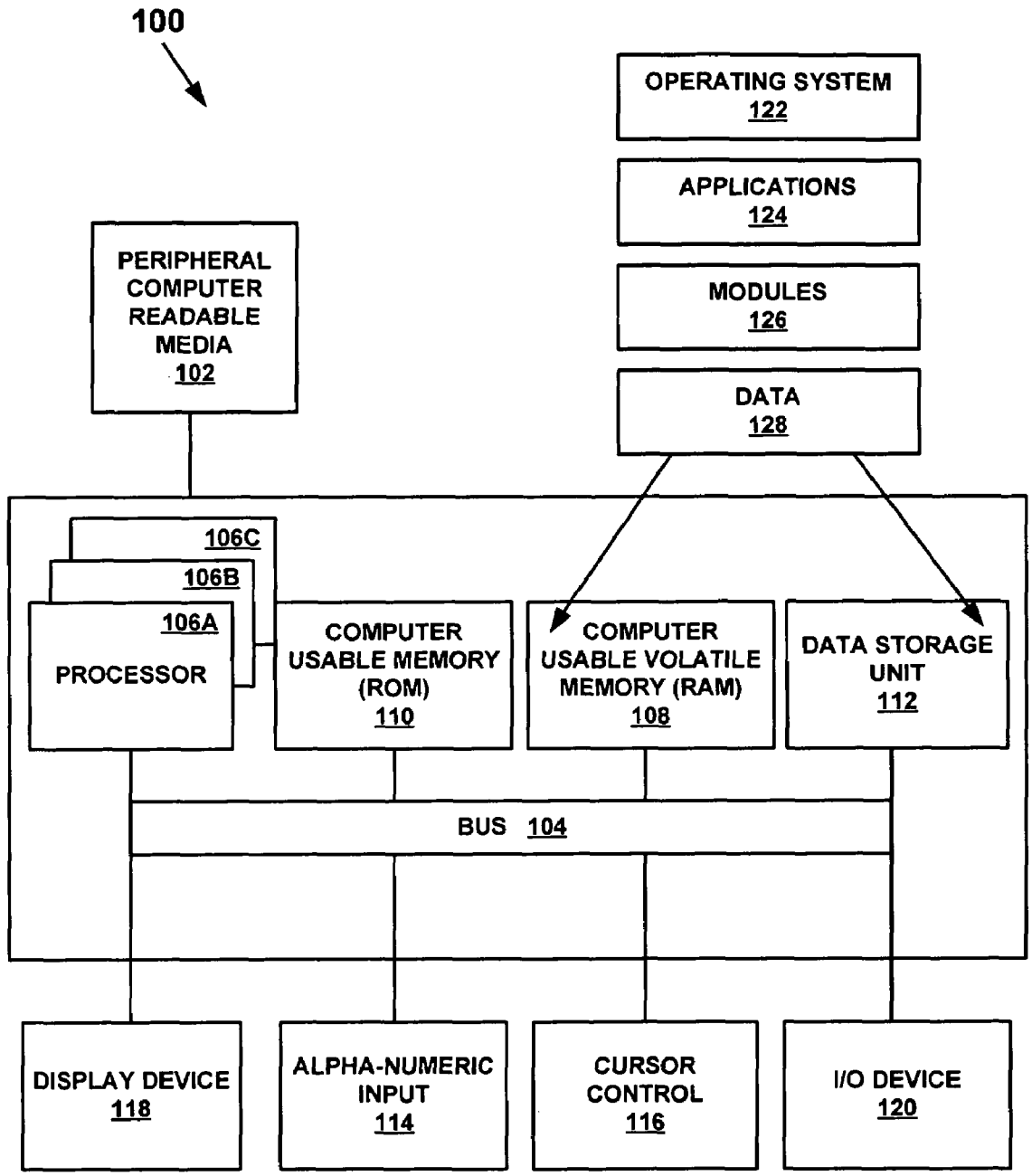
FIG. 1 is a diagram of an exemplary computer system used in accordance with embodiments of the present technology for distributed peer attack alerting.

With reference now to FIG. 1, portions of the technology for distributed peer attack alerting are composed of computer-readable and computer-executable instructions that reside, for example, in computer-usable media of a computer system. That is, FIG. 1 illustrates one example of a type of computer that can be used to implement embodiments, which are discussed below, of the present technology for distributed peer attack alerting.

FIG. 1 illustrates an exemplary computer system 100 used in accordance with embodiments of the present technology for distributed peer attack alerting. It is appreciated that system 100 of FIG. 1 is exemplary only and that the present technology for distributed peer attack alerting can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a network adapter for enabling wired or wireless communications between system 100 and an external network such as, but not limited to, the Internet. A more detailed discussion of the present technology for distributed peer attack alerting is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for distributed peer attack alerting, for example, is stored as an application 124 or module 126 in memory locations within RAM 108 and memory areas within data storage unit 112.

Overview

In order to respond effectively to a self-propagating malicious code outbreak (e.g., a computer worm) or a malicious computer attacker rapidly targeting many systems, system administrators need to detect and contain the problem quickly before it becomes widespread. Failure to do so can result in untold damages, including system instability, downtime and data loss.

In one embodiment, an agent-based system comprising multiple hosts (e.g., nodes) form a distributed community. In this agent-based community, the community comprises a leader or number of leaders. In this example, the leaders monitor for attacks with an attack identification system (e.g., virus protection system). For example, leaders monitor for initial signs of attack such as attempts to connect to non-existent services and communicate with them. In response to detecting an attack, a leader-moderated petition process can be used to organize rapidly an alert to others within and sometimes outside the community so that they can learn the nature of the attack and methods for protection against such attacks.

In general, a logical grouping of distributed agents (e.g., node on a network) form a community and collaborate with each other to share their knowledge of targeted malicious activity and alert peer agents that have yet to experience that malicious activity so they can (automatically) configure their protection technologies to mitigate that threat. Embodiments of the present technology for distributed peer attack alerting help contain or slow down a community wide attack.

The above community makes use of a "petition model" to facilitate security incident alerting and containment, where a single participant can create and circulate a petition to propose taking action on a detected malicious behavior, in one embodiment. Other participants can vote on the petition and upon reaching a threshold consensus, the leader of the community issues a response command to the entire community who are instructed to protect themselves from the detected malicious activity (e.g., attack). In one embodiment, the petition/voting model and the threshold mechanism detects attacks on a community of agents.

Exemplary Implementation of the Technology

Agents (e.g., nodes) form a community or cloud of peers through joining a network. A plurality of agents elect a single or many leaders. It is appreciated that any number of election/leadership methods or systems could be used in accordance with embodiments of the present technology for distributed peer attack alerting. In one embodiment, agents use common attack detection/prevention techniques to stop attacks against themselves. However, it is appreciated that agents within the community could use different attack detection/prevention techniques and some agents, in this embodiment, may be trusted more than others, depending on which attack detection/prevention system they are using.

When a specific attack is detected/prevented, the agent creates a petition (such as a digitally signed document) containing information about the attack. A petition could include any information associated with the attack, such as the source of the attack (e.g., IP address), the identity of the host that was attacked, the specific resources that were targeted (e.g., ports, services, user accounts, etc.), snapshots of what the attack looked like through network protocols or operating system objects, the local or relative time of the attack, actions that were taken to block that and future attacks and any other information related to the attack (such as human readable description) in accordance with the present technology for distributed peer attack alerting.

The petition could be circulated within the cloud of agents with the leader initiating a voting round. In one embodiment, a voting round tallies like-petitions. Alternatively, agents can send their petitions directly to a leader. In either case, leaders can validate a petition (e.g., check a digital signature) prior to accepting them. To avoid generating duplicate petitions, prior to sending out a petition, agents can check to see if they are about to generate a petition with duplicate properties such as duplicate sources of attack. Agents in those cases can sign the original petition as a vote for that petition, for example.

To track activity levels for a particular attack type, leaders can monitor a petition for a threshold of petitions or votes, including their own vote. Leaders can also place expiry properties on petitions based on clock information or any other information and invalidate a petition upon reaching the expiry properties (e.g., transmitting to the community or silently invalidating). Votes for old petitions would be treated as new, original petitions in one embodiment.

For example, when a threshold is reached, leaders can create an alert derived from the properties of the like-petitions, along with instructions prohibiting certain actions on the host or change security instructions on the host (e.g., automatically configure alert protection/prevention system). In one embodiment, the alert is transmitted to the entire community (e.g., distributed peer network).

In one embodiment, multiple leaders are used. In a multi-leader arrangement, the first leader that reaches the threshold number of votes for a particular petition type can notify their peer leader(s) of their conclusion. To distribute alerting responsibilities, each leader could be assigned to different agents in the community or could be assigned to all agents of the community. Agents receiving the alert verify and apply the instructions/actions (e.g., permanently, temporarily, time-based, etc.) and protect themselves from a wider spread attack. This could be accomplished through a variety of means such as network traffic filtering out the source attacker, blocking access to resources through the operating system's access control system, logically removing themselves from a network, reconfiguring any local security policy or any other means for protecting themselves in accordance with the present technology for distributed peer attack alerting.

Figure 2:
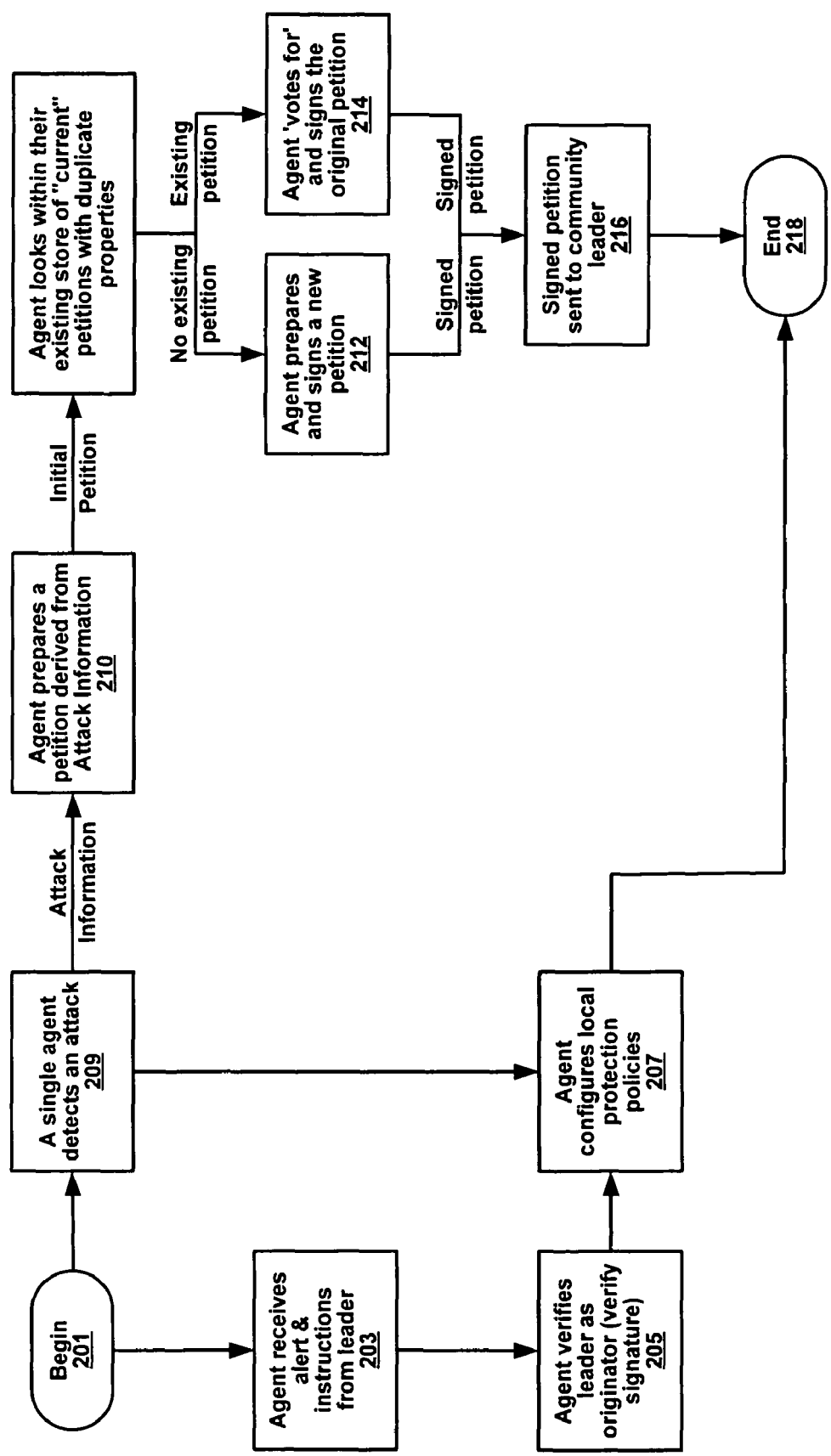
FIG. 2 is an exemplary data flow diagram in accordance with embodiments of the present technology for distributed peer attack alerting

With reference now to FIG. 2, an exemplary data flow diagram 200 in accordance with embodiments of the present technology for distributed peer attack alerting. In one embodiment, a first exemplary method for distributed peer attack alerting begins at 201. In this embodiment, an agent (e.g., node on a network) receives an alert and in one embodiment, the alert comprises instructions at 203. The alert and/or instructions could be received from a leader of a group of nodes on a network. The agent could then verify the sender (e.g., leader) as the originator of the alert at 205 to avoid being spoofed or tricked (e.g., an unauthorized sender generating a message that appears to come from an authorized address). The agent could, for example, verify the alert by an electronic signature, however, it is appreciated that any number of verification techniques (e.g., verification systems or verification methods) could be used in accordance with the present technology for distributed peer attack alerting. In response to the alert, the agent could configure a local protection policy at 207 and end at 218. The local protection policy (e.g., a local attack protection system) could also be automatically configured in response to receiving the alert at 203 and/or verifying the alert in 205.

Still with reference to FIG. 2, an exemplary data flow diagram 200 in accordance with embodiments of the present technology for distributed peer attack alerting. In one embodiment, an exemplary method for distributed peer attack alerting begins at 201. In this example, a single agent determines/identifies an attack at 209. At 209, the agent can either configure local protection policies at 207 and end at 218 or can compile attack information and prepare a petition derived from the attack information at 210. At 212, the agent looks within their existing store of "current" petitions with duplicate or similar properties. If no existing petition comprises similar characteristics, at 212, the agent prepares and signs (e.g., digitally signs) the petition as "new". If the agent finds a similar petition, at 214, the agent "votes for" and signs the original petition. At 216, the signed petition (either a "newly created" petition or a "voted for" existing petition) is sent to a community leader. The method ends at 218.

Figure 3:
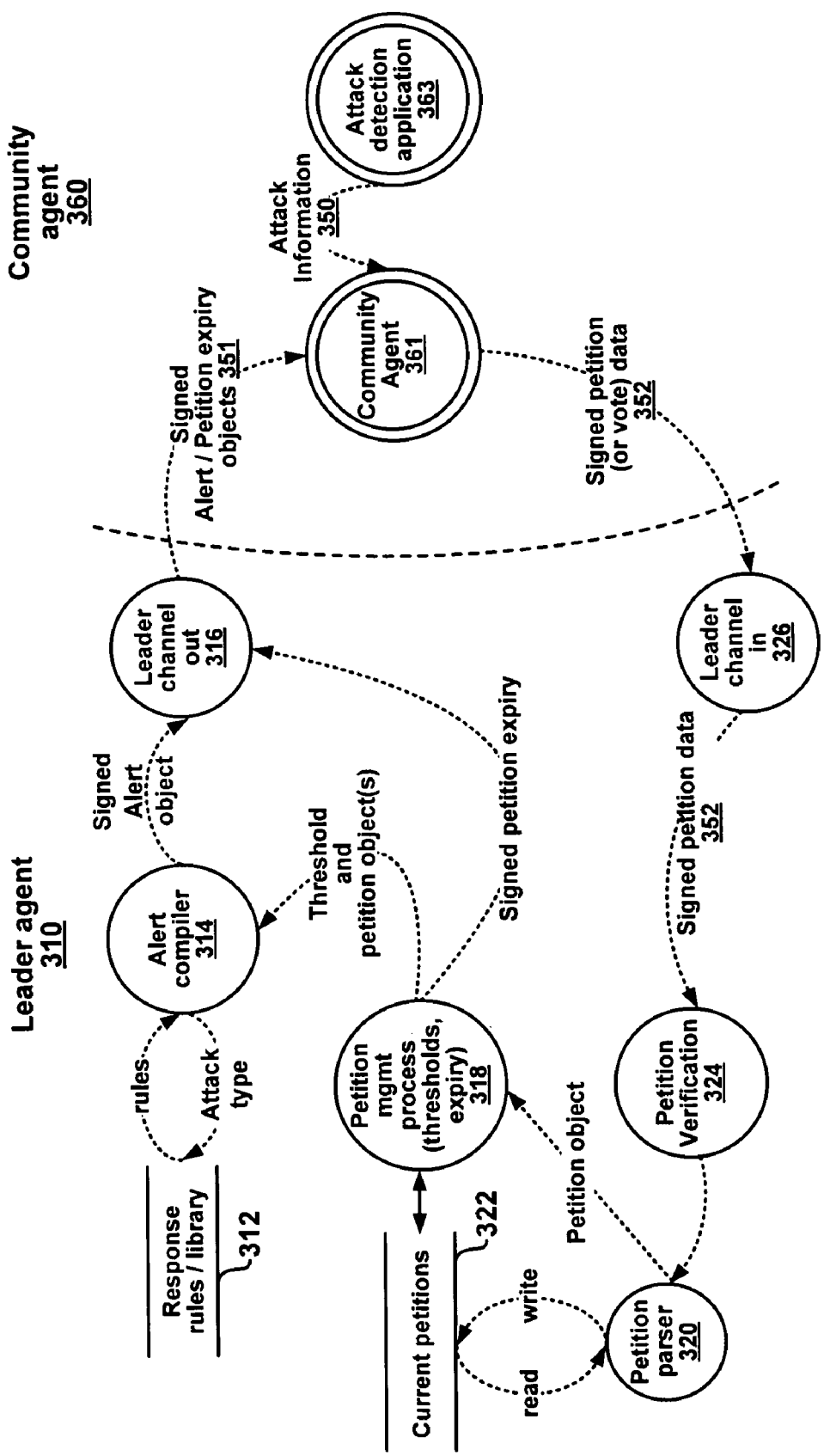
FIG. 3 is an exemplary data flow diagram of communication between a leader agent and a community agent in accordance with embodiments of the present technology for distributed peer attack alerting.

FIG. 3 is an illustration of an exemplary data flow diagram 300 for distributed peer attack alerting in accordance with the present technology. On a community agent side 360, an agent 361 identifies an attack with attack detection application 363. It is appreciated that the attack detection application can be any application for identifying or preventing an attack or any malicious activity and could be a local application or an application that is shared between a plurality of agents. In one embodiment, the attack information 350 is compiled by the agent 361. The attack could then be classified into one of a plurality of attack types.

To avoid alerts that are expired, the agent 361 may have access to signed alert petition expiry objects 351. The agent sends either the new petition or the signed existing petition 352 to a leader agent 310 via a leader channel in 326. The signed petition data 352 is passed by a petition verifier 324 for verification. In one embodiment, a digital signature (associated with the agent 361) is verified. Once the petition is verified, in one embodiment, a petition parser 320 updates the current petitions. In the case of a "new" petition, the petition parser 320 adds the new petition to the current petitions 322. In the case the petition is an existing petition, the petition parser 320 increments a counter associated with the existing petition.

To organize and manage petitions, a petition manager 318 manages petitions by checking threshold values and expiry properties associated with particular petitions. If a petition is determined to be expired, the leader agent 310 may transmit the expiration to other agents through an agent out channel 316. If a threshold value is reached for a particular petition, an alert compiler 314 compiles an alert for other agents within or outside the community. The alert compiler 314 may access a response/rules library 312 to determine rules/actions other agents should take to prepare for a particular attack. The leader agent signs the alert and transmits the alert to other nodes on the network via the leader out channel 316.

FIG. 4 is a flow diagram of an exemplary computer implemented method 400 for distributed peer attack alerting in accordance with embodiments of the present technology. In one embodiment, method 400 can be performed within a peer to peer community for distributed peer attack alerting. At 402, method 400 includes accessing a peer community, the peer community comprising a plurality of nodes comprising a network wherein at least one of the plurality of nodes comprises access to an attack identifier (e.g., acts like an attack identifier). In one embodiment, the nodes of the network use a common attack identifier, however, it is appreciated that any number of attack identifiers could be used in accordance with embodiments of the present technology for distributed peer attack alerting. It is appreciated that the attack identifier could be a local resource, or a shared remote resource.

At 404, method 400 includes identifying an attack at one of the plurality of nodes. In one embodiment, an attack includes any malicious activity identified at a particular node. When a specific attack is detected/prevented, the agent creates a petition (such as a digitally signed document) containing information about the attack. A petition could include any information associated with the attack, such as the source of the attack (e.g., IP address), the identity of the host that was attacked, the specific resources that were targeted (e.g., ports, services, user accounts, etc.), snapshots of what the attack looked like through network protocols or operating system objects, the local or relative time of the attack, actions that were taken to block that and future attacks and any other information related to the attack (such as human readable description) in accordance with the present technology for distributed peer attack alerting At 406, method 400 includes transmitting an alert to the plurality of nodes, the alert comprising information associated with the attack. In one embodiment, the alert includes instructions for other nodes to follow to prevent the attack.

At 408, method 400 includes automatically configuring at least one attack identifier associated with one of the plurality of nodes in response to the transmit alert. In one embodiment, security policies for a particular node are modified in response to the alert.

FIG. 5 is a data flow diagram of an exemplary computer implemented method 500 for distributed peer attack alerting in accordance with embodiments of the present technology. It is appreciated that method 500 could be implemented within a peer community comprising a plurality of nodes comprising a network wherein at least one of the nodes comprises access to an attack identification system. It is appreciated that any number of methods could be used to form any number of different networks in accordance with embodiments of the present technology. For example, the network could be a ring and nested ring network.

In this example, a simple ring topology is created where nodes in the network have at least one predecessor to receive messages from and one successor to send messages to. It is appreciated that a nested ring topology could be used where specific nodes (e.g., a leader node) can have predecessors and successors that are outside their original ring, creating a ring of rings. It is also appreciated that a hierarchical network (e.g., including a mesh network, a star network or a tree network), butterfly networks, or any other network could also be formed in accordance with embodiments of the present technology.

It is also appreciated that the peer community could be pre-defined, meaning a hierarchy (or tree) of nodes is defined where, for example, leaf nodes are added to nearest peers. In another example, pre-defined pools of nodes could be manually identified (e.g., by a leader node or administrator node) or logical partitions or domains where nodes with specific properties are assigned to a given logical group of nodes.

In another example, the peer community is self-organized by the nodes of the community, meaning nodes with common properties could be used to introduce nodes to each other. However, it is appreciated that any number of methods of forming a peer community could be used in accordance with embodiments of the present technology.

At 502, method 500 includes identifying an attack at one of the plurality of nodes. In one embodiment, information associated with the attack is accessed.

At 504, method 500 includes generating an alert petition associated with the attack, the alert petition comprising information associated with the attack. To avoid generating a duplicate petition, an agent could examine a store of current petitions to see if there is an existing petition that has similar properties. If there is an existing petition, the agent may submit a vote for that particular petition instead of creating a new petition.

At 506, method 500 includes automatically configuring at least one attack detection system associated with one of the plurality of nodes in response to the alert petition. For example, an agent could modify protection policies in response to instructions in the alert for protecting against the attack.

It is appreciated that embodiments of the present technology can be performed in a peer community with or without a leader. In one embodiment, leaders are distinguished from non-leaders by being able to manage the threshold levels for declaring an alert.

Thresholds can serve as a means to detect an attack across a community. For example, the threshold can be implemented as a statistical calculation such as a basic count of petitions and/or any other statistical computation can be used to track petitions/votes. In addition, one may use the average number of petitions in a given time period or the number of attacks for a given attack category.

In one embodiment, an adaptive calculation can be used to track threshold values. For example, the threshold may be changed based on surrounding environmental conditions. In one embodiment, environmental conditions can be determined from data gathered from the community, such as an increase in frequency of attacks over a time period or number of nodes in the community. The environmental conditions could also be determined from any data available outside the community. For example, network type, network location, operating system information, time of day, etc. The environmental conditions can also be determined by data that attests to the reliability or trustworthiness of nodes. A further example could be data from external sources that measure security health (like a vulnerability scanner).

In one embodiment, each participant is allowed to vote a predetermined number of times during a particular voting round. In one embodiment, the leader discards extra votes to prevent malicious voting from any node within the community. In another embodiment, a community leader may verify the origin of a vote to make sure it came from an authorized node within the community. This prevents a malicious host from imitating another node within the community and spoofing votes. In another embodiment, participating agents are prevented from initiating more than a certain number of voting rounds in a given time period. This blocks a malicious host from mounting a community-wide denial of service attack by inducing votes or voting rounds. In one embodiment, a host that is seen as voting maliciously can be investigated by a leader.

Embodiments of the present technology, for distributed peer attack alerting improve timely response to an attack by distributing the analysis of whether an attack is widespread amongst a peer community so they can rapidly collaborate within a local or small logical network without having to communicate with a central authority which could be a single point of failure.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for distributed peer attack alerting comprising:
   accessing a peer community, said peer community comprising a plurality of nodes comprising a network wherein at least one of said plurality of nodes comprises access to an attack identifier;
   identifying an attack at a first one of said plurality of nodes comprising access to said attack identifier;
   transmitting an alert petition to others of said plurality of nodes, said alert petition comprising information associated with said attack;
   automatically configuring at least one attack detection system associated with one of said plurality of nodes in response to said alert petition;
   determining, by a second one of said plurality of nodes, whether said alert petition has expired;
   transmitting, from said second one of said plurality of nodes, an indication of an expiration of said alert petition to others of said plurality of nodes to invalidate said alert petition when said alert petition is determined to have expired;
   determining, by said second one of said plurality of nodes, whether a threshold value has been reached; and
   creating and transmitting a command, based at least partially on said alert petition, to a second plurality of nodes instructing the second plurality of nodes to protect themselves from said attack when said threshold value is determined to have been reached.

2. The computer implemented method as described in claim 1 further comprising:
   determining a classification type associated with said attack; and
   analyzing a characteristic value associated with said classification type.

3. The computer implemented method of claim 2 further comprising:
   accessing a threshold value associated with said classification type; and
   comparing said accessed threshold value to said characteristic value.

4. The computer implemented method of claim 1 further comprising:
   electing one of said plurality of nodes to be a leader node of said plurality of nodes.

5. The computer implemented method as described in claim 1 wherein said command comprises instructions to recover from or prevent said attack.

6. The computer implemented method as described in claim 5 wherein said instructions are time-based.

7. The computer implemented method as described in claim 1 wherein said command is digitally signed by one of said plurality of nodes on said network.

8. A storage device having instructions recorded therein, such that when the instructions are executed, a computer system performs a method for distributed peer attack alerting, said computer-implemented method comprising:
   identifying an attack at one of a plurality of nodes of a network, said one of said plurality of nodes comprising access to an attack detector;
   generating an alert petition associated with said attack, said alert petition comprising information associated with said attack;
   automatically configuring at least one attack detector associated with one of said plurality of nodes in response to said alert petition;
   determining whether a threshold value associated with said alert petition has been reached;
   creating and circulating a command, based at least partially on said alert petition, to a second plurality of nodes instructing the second plurality of nodes to protect themselves from said attack when said threshold value is determined to have been reached; and
   changing said threshold value based on surrounding environmental conditions, wherein
   the storage device is one of a computer-usable volatile memory, a computer-usable non-volatile memory, a peripheral computer readable medium, or a data storage unit.

9. The storage device as described in claim 8, wherein the method further comprises:
   transmitting said alert petition to one or more of said plurality of nodes.

10. The storage device as described in claim 8, wherein the method further comprises:
    classifying said alert petition to a particular attack type category; and
    determining a characteristic value associated with said attack type category.

11. The storage device as described in claim 10, wherein the method further comprises:
    comparing said characteristic value associated with said attack type category to a second threshold value associated with said attack type category.

12. The storage device of claim 11, wherein the method further comprises:
    performing a first action in response to said characteristic value less than said second threshold value and performing a second action in response to said characteristic value greater than said second threshold value.

13. The storage device of claim 8, wherein the method further comprises:
    determining one of said plurality of nodes to be a leader node of said plurality of nodes.

14. The storage device as described in claim 8 wherein said alert petition comprises instructions to configure said attack detector in response to said attack.

15. A system for distributed peer attack alerting comprising:
    a first node of a plurality of nodes of a network, said first node being configured for detecting an attack at said first node and for transmitting an alert petition to others of said plurality of nodes in response to detection of said attack, said alert petition comprising information associated with said attack, and said alert petition being a petition for proposing to take an action on said detected attack, wherein:
    at least one of said plurality of nodes has an associated attack detection system which is further configured in response to said alert petition, and
    said first node is further configured to avoid transmitting a duplicate alert petition by checking whether said first node is about to generate an alert petition with duplicate properties with respect to said transmitted alert petition;

wherein each of said plurality of nodes comprises at least one microprocessor.

16. The system as described in claim 15 wherein one or more of said plurality of nodes is a leader node.

17. The system as described in claim 15, wherein one of said plurality of nodes is configured to classify said attack to a particular type.

18. The system as described in claim 15, wherein one of said plurality of nodes is configured to classify said attack into one or more classification types and to analyze characteristics associated with said attack.

19. The system as described in claim 15, wherein said first node is further configured to vote for said alert petition instead of transmitting said duplicate alert petition when said first node determines that said first node is about to generate said duplicate alert petition.

20. The system of claim 16, wherein:

said leader node is configured to create and transmit an alert, based at least partially on said alert petition, when a threshold value has been reached, said alert including instructions to protect against said attack, and said threshold value is adjustable based on environmental conditions.

* * * * *